United States Patent
Francese

(10) Patent No.: US 9,628,302 B2
(45) Date of Patent: Apr. 18, 2017

(54) DECISION FEEDBACK EQUALIZER

(71) Applicant: International Business Machines Corporation, Armonk, NY (US)

(72) Inventor: Pier Andrea Francese, Adliswil (CH)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/719,032

(22) Filed: May 21, 2015

(65) Prior Publication Data
US 2016/0344576 A1 Nov. 24, 2016

(51) Int. Cl.
H03H 7/30 (2006.01)
H03H 7/40 (2006.01)
H03K 5/159 (2006.01)
H04L 25/03 (2006.01)

(52) U.S. Cl.
CPC ............ H04L 25/03057 (2013.01)

(58) Field of Classification Search
None
See application file for complete search history.

(56) References Cited

U.S. PATENT DOCUMENTS

| | | | |
|---|---|---|---|
| 6,047,026 A * | 4/2000 | Chao | H04L 25/03057 375/233 |
| 7,715,474 B2 | 5/2010 | Park | |
| 7,792,187 B2 | 9/2010 | Bulzacchelli | |
| 2007/0097765 A1* | 5/2007 | Huang | G11C 7/062 365/205 |
| 2012/0133535 A1* | 5/2012 | Verbruggen | H03M 1/002 341/110 |
| 2013/0243070 A1 | 9/2013 | Ito | |
| 2013/0322512 A1 | 12/2013 | Francese | |

FOREIGN PATENT DOCUMENTS

KR 10-2011-0129389 10/2013

OTHER PUBLICATIONS

Pedram Payandehnia et al. A 4mW 3-tap 10 Gb/s Decision Feedback Equalizer, Circuits and Systems (MWSCAS), 2011 IEEE 54th International Midwest Symposium on, Aug. 7-10, 2011, pp. 1-4.

* cited by examiner

Primary Examiner — Shuwang Liu
Assistant Examiner — Gina McKie
(74) Attorney, Agent, or Firm — Daniel P. Morris; Otterstedt, Ellenbogen & Kammer, LLP

(57) ABSTRACT

A decision-feedback equalizer for use in a receiving unit for receiving an incoming data stream and for providing a stream of bit data outputs, including at least one decision-feedback equalizer block comprising a plurality of speculation units. Each speculation unit includes a dynamic preamplifier for asynchronously amplifying a voltage difference depending on an input voltage of the incoming data stream and a given threshold voltage; and an arrangement for selectively generating a transconductor current which depends on the amplified voltage difference. Also included is one dynamic regenerator for associating an output data bit to the selectively generated transconductor current.

14 Claims, 5 Drawing Sheets

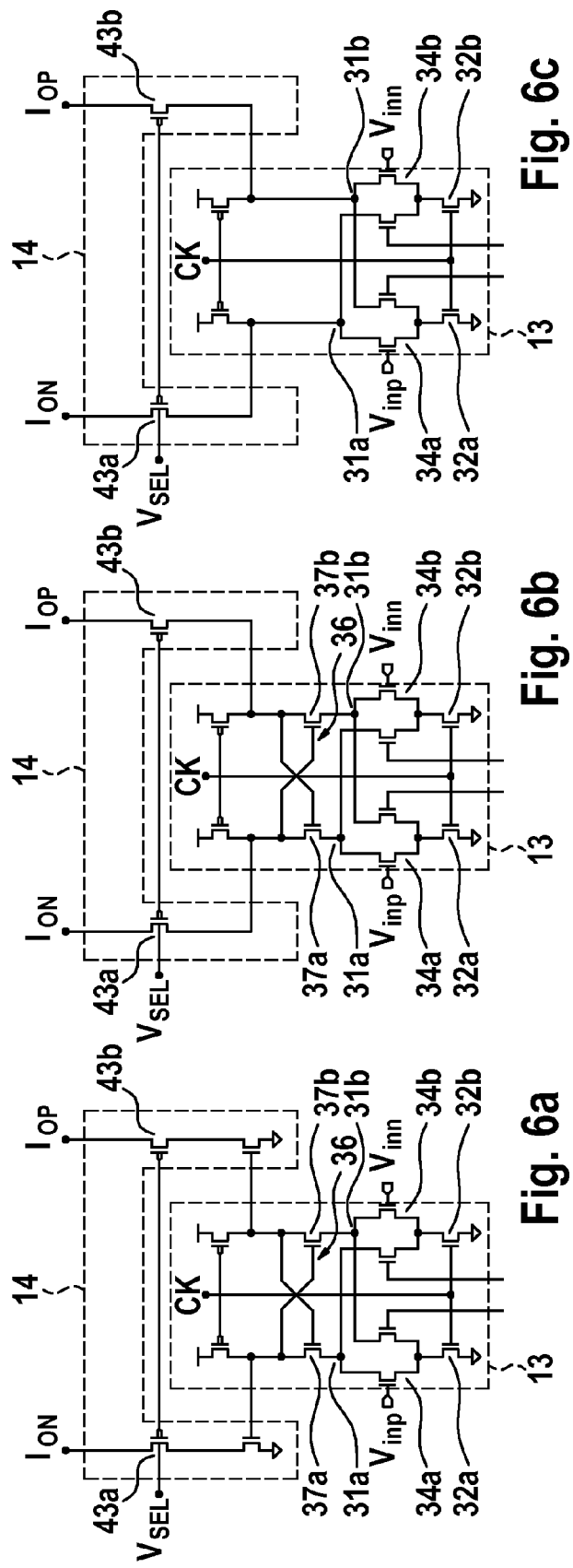

DECISION FEEDBACK EQUALIZER

BACKGROUND

The present invention relates to a decision-feedback equalizer for use in an input buffer. In particular, the present invention relates to implementations of decision-feedback equalizers with improved power efficiency, increased bandwidth and reduced circuit area.

Today's data networks require high-speed data communication with serial link data rates of more than 10 Gbit/s. In this bandwidth range, a further increase of serial link data rates is challenging due to the limited general bandwidth. The general bandwidth is usually determined by dielectric losses and reflections on the transmission channel which result in a widening of the transmitted signal pulses over more than one unit interval, so that the received signal is distorted by intersymbol interference.

These signal distortions are usually compensated for by means of equalizing functions in the receiving circuitry, such as feed-forward equalizing and decision-feedback equalizing. A decision-feedback equalizer (DFE) is capable of reducing signal distortions while leaving noise or cross-talk unaffected.

In general, a decision-feedback equalizer is included in the digitalized data path at an output side of an analog-digital converter and is substantially configured to compensate for the effects of one transmitted pulse onto one or more succeeding pulses of the incoming stream of digitalized data samples. The general concept of a decision-feedback equalizer implementation is to provide at least one comparator used to translate the single pulses of the stream of digitalized data samples into a bit stream. In the comparator, the digitalized data samples are each compared with a respective variable threshold value, which may be generated depending on the history of (preceding) data samples tapped from the output of the decision-feedback equalizer. The variable threshold value is obtained by delaying the bit outputs of the decision-feedback equalizer for one or more clock cycles in a number of delay stages by weighting each of the delayed bit outputs of the decision-feedback equalizer after each stage by a predetermined (preset) coefficient and by then adding the results. The coefficients are preset with respect to a standard pulse response of the specific transmission channel. In particular, the adding-up of the weighted delayed DFE outputs requires adding circuits which usually have a relatively high power and area consumption in an integrated circuit implementation.

An additional approach, known as speculation or loop-unrolling, is to precompute the variable threshold values for each pattern of delayed DFE bit outputs. Speculation or loop-unrolling for DFE is a technique that implements all possible rated summations at the output of a finite impulse response (FIR) filter in the DFE feedback path in order to reduce the critical path time of the DFE coefficients' summation time. All possible combinations of N post-cursors (N taps) intersymbol interference terms are accordingly generated in a speculative decision-feedback equalizer of the order N, so that a total of $2^N$ combinations or speculations are generated. The correct decision is selected among the $2^N$ speculations on the basis of the last N decisions. This approach should help to save area and power impact of the line of adding circuits. However, hardware complexity grows exponentially with the number N of taps, i.e. the number of considered historical data samples. As for each of the threshold values a separate comparator latch is needed, the output of which are to be selected by a multiplexer, the overall circuitry has the disadvantage of requiring a large circuit area and having a high power consumption.

Document U.S. Pat. No. 7,792,187 B2 discloses a decision-feedback equalizer comprising summer circuits configured to add a dynamic feedback signal representing a dynamic feedback tap to a received input and to speculate on a speculative tap; data slicers configured to receive outputs of the summer circuits and sample the outputs of the summer circuits in accordance with a clock signal; first multiplexers, each configured to receive a first input from a corresponding data slicer; and second multiplexers, each configured to receive an output of a plurality of first multiplexers, the second multiplexers having an output fed back to a second input of the first multiplexers and the second multiplexer output being employed to provide a select signal for a second multiplexer on a different section of the DFE and to drive the dynamic feedback signal to a summer circuit on a same section of the DFE. This approach provides that a slave latch of a conventional master-slave flip-flop is replaced by a multiplexer driven by a half-rate clock.

Document US 2013/0322512 A1 discloses a decision-feedback equalizer (DFE) slicer for a receiver, comprising a plurality of non-speculative DFE taps; and 3 speculative DFE taps, wherein the 3 speculative DFE taps comprise first and second multiplexer stages. Each of the first and second multiplexer stages comprises 4 comparator latches, each of which has a programmable offset; and a multiplexer that receives 4 comparator latch outputs from the 4 comparator latches and outputs a multiplexer stage output, wherein the multiplexer is controlled by previous symbol decisions $d_{n-2}$ and $d_{n-3}$, wherein the previous symbol decisions $d_{n-2}$ and $d_{n-3}$ are received from two other respective DFE slices in the receiver. The 3 speculative taps further comprise a 2:1 decision multiplexer stage that receives the multiplexer stage outputs of the first and second multiplexer stages and is controlled by a previous symbol decision $d_{n-1}$ received from a third respective DFE slice in the receiver to output a slice output signal $d_n$.

Document Payandehnia, P. et al "A 4 MW 3-TAP 10 GB/S DECISION-FEEDBACK EQUALIZER", IEEE Date: 7-10 Aug. 2011 relates to a half-rate low-power 3-tap decision-feedback equalizer with an improved switched-capacitor-based summer architecture for speculating the first feedback tap. The other two taps are cancelled using a current summation technique. Further power consumption reduction is achieved by using a sense-amplifier-based slicer and a pass-gate multiplexer.

SUMMARY

According to a first aspect, a decision-feedback equalizer for use in a receiving unit for receiving an incoming data stream and for providing a stream of bit data outputs is provided, including at least one decision-feedback equalizer block comprising:
  a plurality of speculation units, each comprising:
    a dynamic preamplifier for asynchronously amplifying a voltage difference depending on an input voltage of the incoming data stream and a given threshold voltage;
    a means for selectively generating a transconductor current based on the amplified voltage difference;
  one dynamic regenerator for associating an output data bit to the selectively generated transconductor current.

According to a further aspect, a decision-feedback equalizer for use in a receiving unit for receiving an incoming data stream and for providing a stream of bit data outputs, including at least one decision-feedback equalizer block is provided, comprising:

a plurality of speculation units, each comprising:
a dynamic preamplifier for asynchronously amplifying a voltage difference depending on an input voltage of the incoming data stream and a provided threshold voltage;
a selectable voltage to current converter for selectively generating a transconductor current so that it depends on the amplified voltage difference;
one dynamic regenerator for associating an output data bit to the selectively generated transconductor current.

It may be provided that the threshold voltage is respectively associated to the speculation unit. Particularly, to each of the speculation units a unique threshold voltage may be associated.

According to an embodiment, a speculation logic may be provided which is configured to select exactly one of the speculation units depending on at least one previous bit data output, so that the exactly one of the speculation units provides the respective transconductor current while the other speculation units provide no transconductor current.

Furthermore, the speculation units may be interconnected with their outputs to form a current summing node, wherein the input of the one dynamic regenerator is coupled to the summing node.

It may be additionally or alternatively provided that the dynamic preamplifier of each speculation unit includes a differential amplifier.

In particular, the differential amplifier may include a cross-coupled cascade.

Furthermore, the differential amplifier may be connected as a common-gate transconductor to directly provide the transconductor current, wherein a selection transistor is provided to select the transconductor current to be supplied to the dynamic regenerator.

Moreover, the means for selectively generating a transconductor current may include a transconductor to convert an output voltage of the differential amplifier to the transconductor current.

Alternatively or additionally, the dynamic regenerator may include a pair of cross-coupled inverters receiving the selected transconductor current to provide an output voltage corresponding to an output data bit depending on the sign of the transconductor current.

The output of the dynamic regenerator may be coupled with a domino latch to hold the spread output voltage as the output data bit which is the binary decision result of the dynamic regenerator.

It may be provided that two decision-feedback equalizer blocks are configured to be operated in an interleaving manner.

According to a further aspect, a receiving unit is provided comprising the above decision-feedback equalizer.

BRIEF DESCRIPTION OF THE DRAWINGS

Embodiments are described in more detail in conjunction with the accompanying drawings, in which:

FIGS. 6a to 6c show circuit diagrams of the dynamic preamplifier and a selectable transconductor in different variants with and without cascaded MOS as selector and/or with and without a cross-coupled cascade in the dynamic preamplifier.

DETAILED DESCRIPTION

In the following, a decision-feedback equalizer to be implemented as an integrated circuit is disclosed. The decision-feedback equalization substantially compensates and mitigates intersymbol interferences and/or DC creep in a data stream received across a communication channel which are to be digitized to provide data samples for further evaluation.

Figure 1:
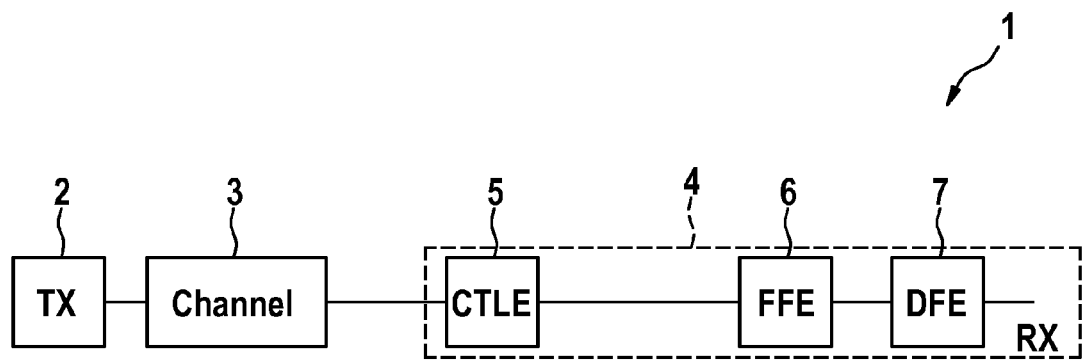
FIG. 1 schematically shows a receiving unit for receiving a high-speed data stream using a decision-feedback equalizer.

In detail, FIG. 1 illustrates a transmission system 1 having a transmission unit 2 which is configured to transmit a serial data stream over a transmission channel 3 to be received by a receiving unit 4. The data stream is received by way of an optional analog equalizer 5, such as a continuous time linear equalizer, which is generally known in the art and thus not further referred to herein.

In general, the bandwidth of the transmission channel 3 may be reduced by dielectric losses and reflections due to impedance discontinuities. In the time domain, the limited channel bandwidth results in a broadening of the transmitted signal pulses over more than one unit interval, so that the signal received at the receiving unit 4 is distorted by intersymbol interferences.

The common method of compensating for signal distortions caused by the limited channel bandwidth is the application of equalization functions which may be implemented in a feed-forward equalizer 6 and a decision-feedback equalizer 7. Decision-feedback equalizers 7 are usually well suited for flattening the general response, thereby reducing signal distortions.

Figure 2:
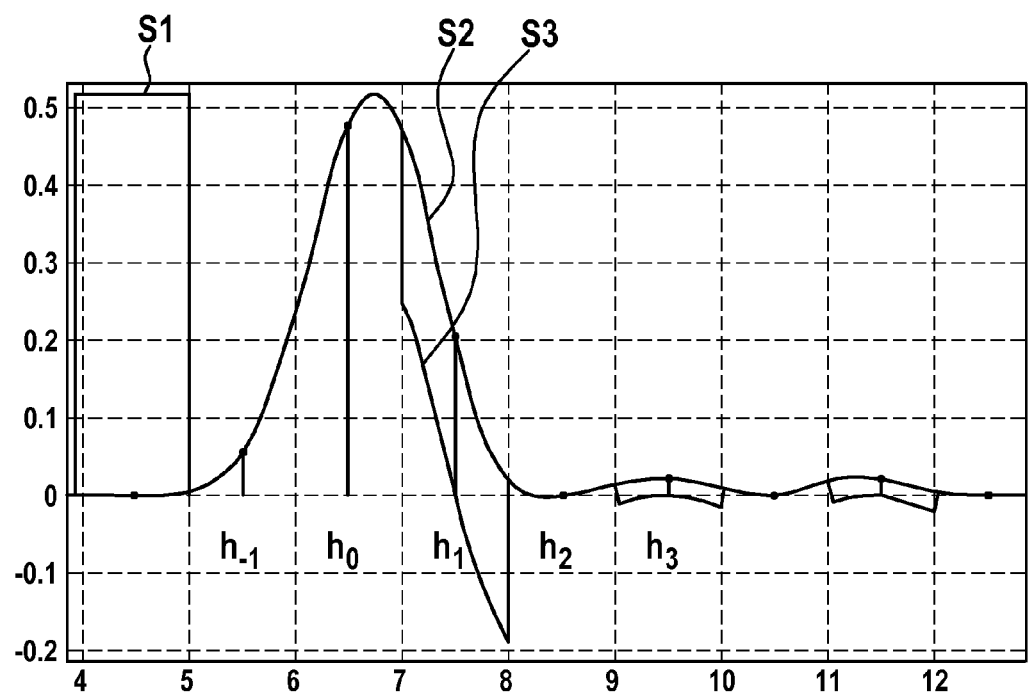
FIG. 2 shows a diagram for illustrating an impulse response before and after a decision-feedback equalization.

FIG. 2 shows an exemplary portion of a received data stream with one signal impulse on an input side of the receiving unit 4 and characteristics resulting after the compensation by means of decision-feedback equalization. It can be seen that for an exemplary data pulse, as shown in the waveform S1 of a rectangular data pulse provided on the transmitting side, the signal response after transmission through the transmission channel 3 is shown as the waveform S2 of the received analog signal. It can further be seen that, compared to the original data pulse, the received signal is broadened due to dielectric losses and results in signal variations following the broadened impulse caused by reflections due to impedance discontinuities. Sampling may occur at sampling times determined by the provided clock signal CLK.

The values of the sampled data are indicated relative to the cursor indicating the sampling value $h_0$ of a main pulse portion of the transmitted signal, followed by more sampling values $h_1$ to $h_n$ (first to $n^{th}$ post-cursor) which are related to the respective transmitted data pulse and are caused by the signal distortion on the transmission channel 3 due to the respective transmitted data pulse. Due to the broadening of the impulse response of the transmission channel 3, a signal distortion caused by the respective transmitted data pulse can also be observed one clock cycle before the actual sampling of the main pulse portion (main cursor $h_0$). The sampling value thereof is designated as precursor $h_{-1}$. The purpose of decision-feedback equalization is to reduce the post-cursor intersymbol interferences at their respective sampling times as much as possible. The result of such decision-feedback equalization is indicated by the equalized signal characteristics S3.

Figure 3:
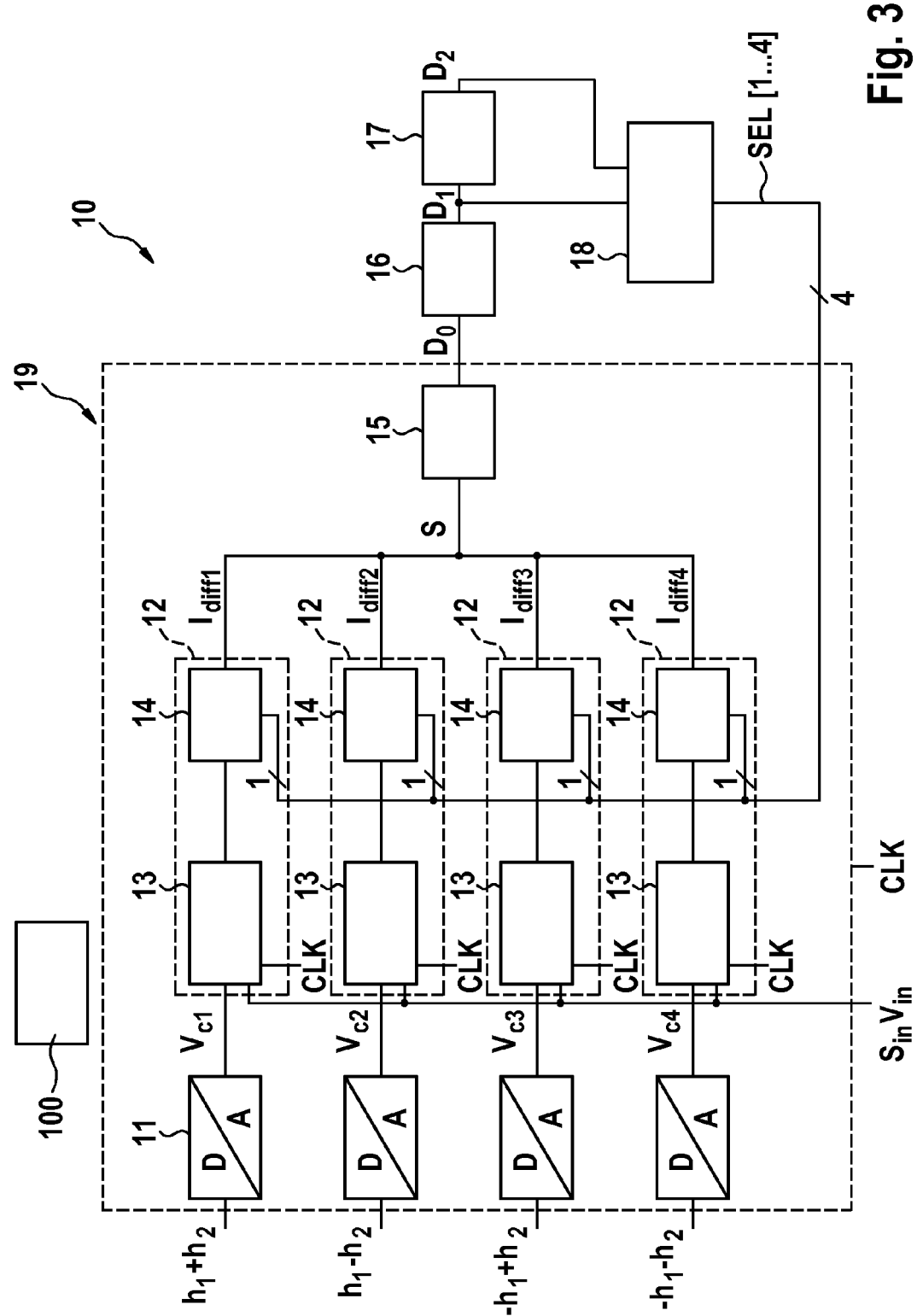
FIG. 3 schematically shows a full-rate decision-feedback equalizer.

FIG. 3 shows a full-rate decision-feedback equalizer 10 with two taps which can be applied as the decision-feedback equalizer 7 in the transmission system 1 of FIG. 1.

The full-rate decision-feedback equalizer 10 of FIG. 1 has an unrolled loop architecture, so that four differential threshold levels $h_1+h_2$, $h_1-h_2$, $-h_1+h_2$, $-h_1-h_2$ for a comparison with a received input signal $S_{in}$ are provided. A threshold level may be variably preset by a calibration unit 100 and may be particularly formed by a sum of a first post-cursor value $h_1$ and a second post-cursor value $h_2$, which are respectively combined with different signs to provide four different threshold levels. In case of N taps, i.e. N successively delayed outputs of the DFE $2^N$ threshold levels need to be provided. The first and second post-cursor values $h_1$, $h_2$ might be variably set as digital values which are then digital-analog converted in respective digital-analog converters 11 to provide respective different analog post-cursor voltages $V_{c1}$, $V_{c2}$, $V_{c3}$, $V_{c4}$. The number of digital-analog converters 11 corresponds to the number $2^N$ of threshold levels applied.

The analog post-cursor voltages $V_{c1}$, $V_{c2}$, $V_{c3}$, $V_{c4}$ are each applied to a separate speculation unit 12. Each of the speculation units 12 has a dynamic preamplifier 13 in which a voltage difference $V_{diff1}$, $V_{diff2}$, $V_{diff3}$, $V_{diff4}$ between the respectively applied post-cursor voltage $V_{c1}$, $V_{c2}$, $V_{c3}$, $V_{c4}$ and the received input voltage $V_{in}$ of an input signal $S_{in}$ is amplified, so that the respective voltage difference $V_{diff1}$, $V_{diff2}$, $V_{diff3}$, $V_{diff4}$ is amplified.

The dynamic preamplifier 13 operates asynchronously. A sample and hold circuit to provide Vin for the input signal may be provided but is not necessary. Thereby, the sign of the voltage difference $V_{diff1}$, $V_{diff2}$, $V_{diff3}$, $V_{diff4}$ which carries the information sampled from the input signal $S_{in}$ is maintained.

The outputs of the dynamic preamplifiers 13 are supplied to a selectable transconductor 14, respectively. As commonly known, a transconductor 14 converts a voltage to a corresponding current. As the transconductor 14 can be enabled and disabled it can produce the corresponding current at its output or can produce a current of 0 at its output. Each of the four ($2^N$ for a number of N-taps) selectable transconductors 14 can be enabled by selection of a respective (individual) selection signal SEL [1 . . . 4] and generates a transconductor current $I_{diff1}$, $I_{diff2}$, $I_{diff3}$, $I_{diff4}$ which depends on the voltage difference $V_{diff1}$, $V_{diff2}$, $V_{diff3}$, $V_{diff4}$ supplied by the respective dynamic preamplifier 13, if enabled, or is 0, if disabled. The outputs of the transconductors 14 supplying the transconductor currents $I_{diff1}$, $I_{diff2}$, $I_{diff3}$, $I_{diff4}$ are interconnected at a summing node S and commonly applied to a dynamic regenerator 15. Preferably, the selection signals SEL[1 . . . 4] are controlled such that only one of the transconductors 14 may be activated at a time. Accordingly, at the input of the dynamic regenerator 15 only the transconductor current $I_{diff1}$, $I_{diff2}$, $I_{diff3}$, $I_{diff4}$ of the one activated (selected) transconductor 14 is applied.

Typically, a DFE comparator comprises a dynamic preamplifier (e.g. differential pair) combined with a latch (e.g. two cross-coupled inverters plus reset switches). In the herein described embodiments multiple dynamic preamplifiers without latches or other means for holding digital states, are directly connected via a selectable transconductors to a single latch. So instead of providing a latch for each of the comparators only one latch is needed.

The dynamic regenerator 15 receives the transconductor current $I_{diff1}$, $I_{diff2}$, $I_{diff3}$, $I_{diff4}$ of the selected transconductor 14 and transforms the applied transconductor current $I_{diff1}$, $I_{diff2}$, $I_{diff3}$, $I_{diff4}$ into a digitalized output $D_0$. The digitalized output $D_0$ is delayed by two (or N for N taps) subsequent delay elements 16, 17 to obtain history data outputs $D_1$, $D_2$. The delay elements 16, 17 are configured to delay the digitalized output $D_0$ by one clock cycle.

The history data outputs $D_1$, $D_2$ are supplied to a speculation logic 18 which is configured to generate the selection signals SEL[1 . . . 4] (SEL[1 . . . $2^N$] for N taps) to select one of the selectable transconductors 14 to be active such that the thus selected transconductor 14 applies a transconductor current $I_{diff1}$, $I_{diff2}$, $I_{diff3}$, $I_{diff4}$ depending on the voltage difference $V_{diff1}$, $V_{diff2}$, $V_{diff3}$, $V_{diff4}$ provided by the preamplifier 13 while the other transconductors 14 are deactivated so as to apply a current of 0.

The digital analog converter 11, the speculation units 12 and the dynamic regenerator 15 form a decision-feedback equalizer block (DFE) block 19.

Figure 4:
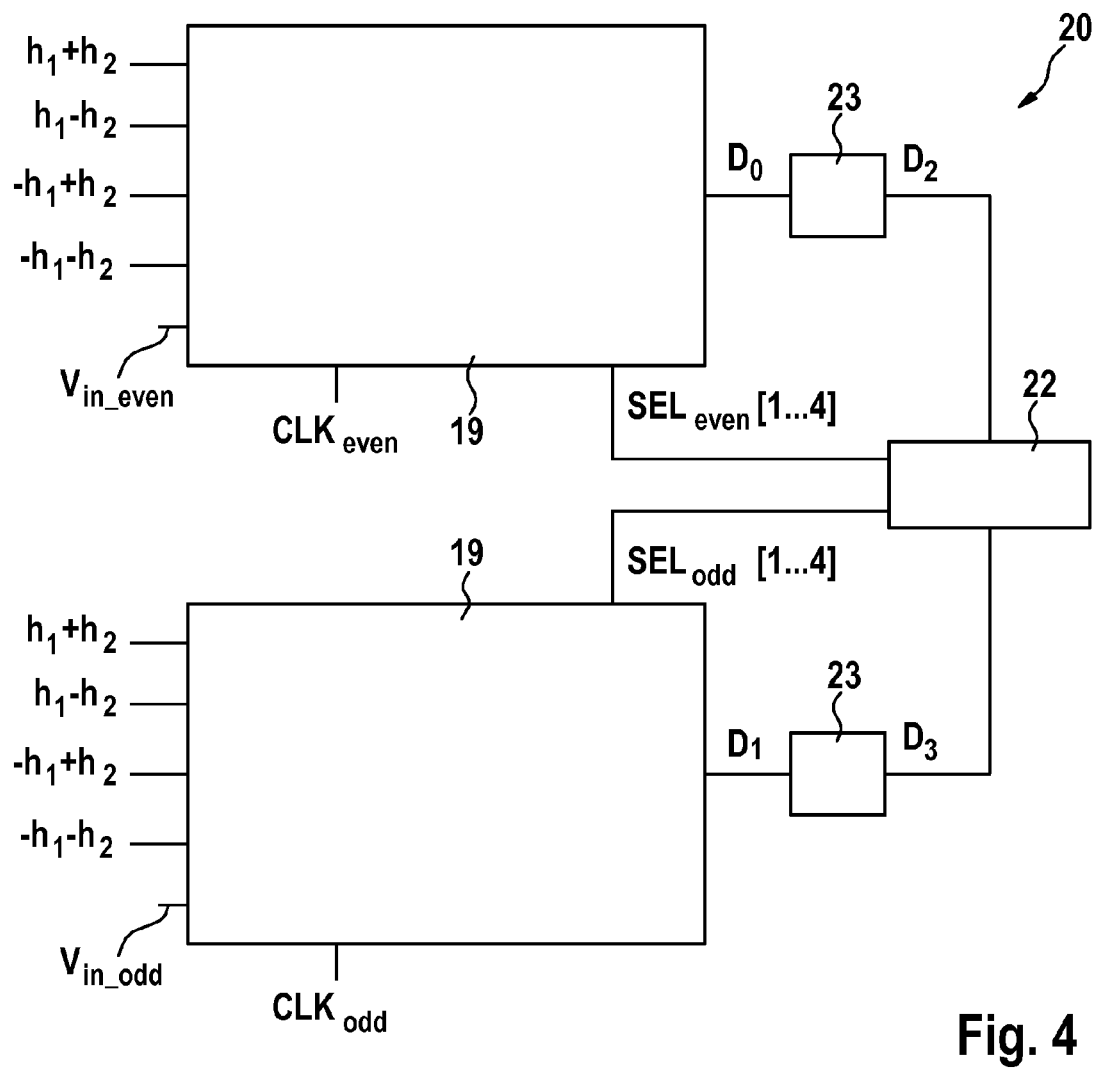
FIG. 4 schematically shows a half-rate decision-feedback equalizer.

FIG. 4 schematically shows a 2-tap half-rate decision-feedback equalizer 20. Substantially, the half-rate decision-feedback equalizer 20 of FIG. 4 mirrors the DFE block 19 of the full-rate decision-feedback equalizer 10 of FIG. 3, wherein both DFE blocks 19 each are operated in an interleaved manner in each half clock cycle (as unit interval) and process data in even and odd clock cycles $CLK_{even}$, $CLK_{odd}$. The outputs of the DFE blocks 19 correspond to subsequent data outputs $D_0$, $D_1$ and are coupled with delay elements 23 with a delay of a full clock cycle each, to provide a second and third order history data output corresponding to the history data output $D_2$ and $D_3$ while the history data output corresponding to $D_1$ is provided as the output of the respective other DFE block 19. Furthermore, input signals $V_{in\_even}$ and $V_{in\_odd}$ are applied to the DFE blocks 19, each sampled in an interleaved manner in each half clock rate. A speculation logic 22, however, processes the delayed digitalized outputs $D_1$, $D_2$ or $D_2$, $D_3$ (depending on and even or odd clock cycle) of the circuit parts and determines a respective selection signal $SEL_{even}[1 . . . 4]$, $SEL_{odd}[1 . . . 4]$ to select the respective transconductor current $I_{diff1}$, $I_{diff2}$, $I_{diff3}$, $I_{diff4}$ in each of the DFE blocks 19.

The decision-feedback equalizers 10, 20 of the DFE in FIGS. 3 and 4 are preferably implemented in a differential form.

Figure 5:
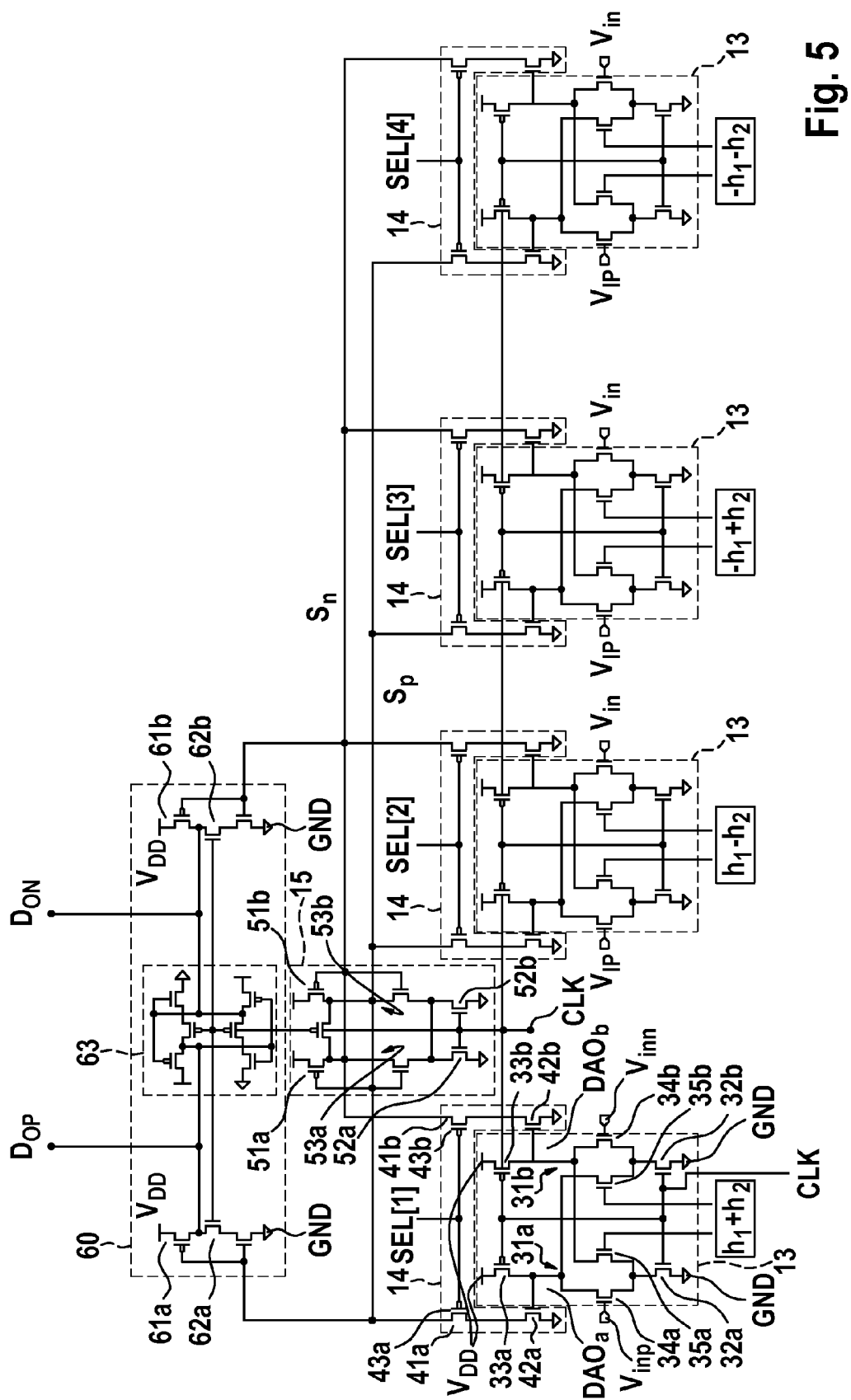
FIG. 5 shows an implementation of a 2-tap full-rate decision-feedback equalizer including a dynamic regenerator and the latch circuit.

In FIG. 5, a more detailed schematic of the dynamic preamplifier 13, the selectable transconductor 14, and the dynamic regenerator 15 of the DFE block 19 is shown on a transistor level.

The dynamic preamplifier 13 is generally formed by a differential amplifier having a first branch 31a and a second branch 31b (a, b indicating the corresponding first and second branches for all following reference signs) in each of which a first and second enable transistor 32a, 33a; 32b, 33b are serially connected.

For each branch 31a, 31b the first enable transistor 32a, 32b may be formed as a MOS transistor of a first conductivity type, such as an NMOS transistor, and is connected with a first terminal to a first supply potential, such as the ground potential GND, while the second terminal is connected to a first terminal of an input transistor 34a, 34b. The input transistors 34a, 34b can be formed as MOS transistors of a first or second conductivity type, such as NMOS or PMOS transistors, respectively. The second terminals of the input transistors 34a, 34b are respectively connected to first terminals of the second enable transistors 33a, 33b. The second enable transistors 33a, 33b may be MOS transistors of a second conductivity type, such as PMOS transistors. The second terminals of the second enable transistors 33a, 33b are coupled with a second supply potential, such as a high supply potential VDD for the given examples of conductivity types.

The gate terminals of the first and second enable transistors 32a, 33a, 32b, 33b of the first and second branches 31a, 31b are connected to a clock signal CLK. The gate terminals of the first input transistors 34a, 34b of the first and second branches 31a, 31b are coupled with both input signal potentials $V_{inp}$, $V_{inn}$ of the differential input signal $S_{in}$, respectively. A respective output node DAOa, DOAb of the differential amplifier, at which preamplifier output potentials can be tapped, is formed at the interconnection of the second terminals of the input transistor 34a, 34b and the first terminals of the second enabling transistors 33a, 33b, respectively.

A threshold transistor 35a is provided connecting the second terminal of the first enabling transistors 32a of the first branch 31a to a second terminal of the input transistor 34b of the second branch 31b. Another threshold transistor 35b is provided connecting the second terminal of the first enabling transistor 32b of the second branch 31b to a second terminal of the input transistor 34a of the first branch 31a. At the gate terminals of the threshold transistors 35a, 35b a threshold voltage corresponding to the respective differential threshold level $h_1+h_2$, $h_1-h_2$, $-h_1+h_2$, $-h_1-h_2$ is applied.

Thereby, a cross-coupling can be achieved, which sets the determination threshold of the preamplifier 13 to the voltage level applied to the gate terminals of the threshold transistors 35a, 35b.

The preamplifier output nodes DAOa, DOAb of the first and second branch 31a, 31b of the preamplifier 13 are connected to the selectable transconductor 14 which transforms the preamplifier output potentials into respective currents. The transconductor 14 has first and second branches 41a, 41b associated to the first and second branches 31a, 31b of the preamplifier 13, each of which has a transconductor transistor 42a, 42b which may be formed as a MOS transistor of the first conductivity type, such as an NMOS transistor, a first terminal of which is connected to the first supply potential, such as ground potential GND, and the gate terminal thereof is connected to the respective preamplifier output node DAOa, DAOb.

Second terminals of the transconductor transistors 42a, 42b are respectively coupled with a first terminal of a selection transistor 43a, 43b whose gate terminal receives the respective selection signal SEL[1 . . . 4] e.g. from the speculation logic 18, 22. The second terminals of the selection transistors 43a, 43b serve as current sources for the two differential signals. The second terminals of the selection transistors 43a of the first branch 41a of the speculation units 12 are interconnected and the second terminals of the selection transistors 43b of the second branch 41b of the speculation units 12 are interconnected to form two differential summing nodes Sn, Sp.

The interconnections of the first branches 41a and the interconnections of the second branches 41b are connected to the dynamic regenerator 15. The dynamic regenerator 15 is activated by the clock signal CLK and serves to hold and amplify the sign of the transconductor current $I_{diff1}$, $I_{diff2}$, $I_{diff3}$, $I_{diff4}$ to a respective voltage potential and an output.

The dynamic regenerator 15 is formed by two cross-coupled clocked inverters 53a, 53b, so that the regenerator 15 separates the potentials at the outputs of the transconductors 14 and consequently digitalizes the sign of the current difference between the two transconductor output currents $I_{diff1}$, $I_{diff2}$, $I_{diff3}$, $I_{diff4}$ of the selected transconductor 14.

The dynamic regenerator 15 has two branches 51a, 51b with a series connection to transistors forming cross-coupled inverters 53a, 53b. Further enabling transistors 52a, 52b formed as MOS transistors of a first conductivity type, such as NMOS transistors, are coupled in series in each of the branches 51a, 51b, respectively, with the inverters 53a, 53b to enable the dynamic regenerator 15 based on the clock signal CLK. The outputs of the two inverters 53a, 53b are each coupled with the respective input of the respective other one of the inverters 53a, 53b, so that cross-coupled inverters are provided. The two inputs of the inverters 53a, 53b are coupled with the outputs of the transconductors 14, respectively. The outputs of the clocked inverters 53a, 53b are interconnected by means of a reset transistor which is activated (closed) by the complementary clock signal level, so that the dynamic regenerator 15 is reset when the clock signal CLK indicates a non-activation of the preamplifier 13.

The potentials of the outputs of the transconductors 14 are drawn to voltage levels by the dynamic regenerator 15, which is then sampled by a domino latch 60 during an active clock phase and held to output the output signal associated to the applied input voltage $V_{inp}$, $V_{inn}$. The domino latch 60 has two branches 61a, 61b including a clocked inverter whose outputs are coupled with a cross coupled inverter pair forming a latch 63 as well known in the art. The cross-coupled inverter pair has a clock input to enable and disable the latch function provided.

In conventional DFE architectures a clocked comparator latch is provided for each threshold value and one of the comparison results is selected by a subsequent multiplexer. One idea of above embodiments for DFE is to replace such a conventional DFE architecture with a speculation unit including a single dynamic preamplifier which has no latch followed by a selectable transconductor for each threshold value. The speculation unit is applied for each threshold of the unrolled loop of speculation. As no latch and no multiplexer is needed, the combination of the dynamic preamplifier and the means for selectively generating a transconductor current can be implemented with a reduced number of transistors, so that a substantial reduction of power consumption and circuit area as well as a substantial increase in bandwidth are possible.

By the use of a speculation unit 12 the selection of a comparison result provided by the dynamic preamplifier 13 is kept in the analog domain while the digitalization/sampling is performed after the selection of the respective comparison result has been made in the selectable transconductor 14. In this manner, latching time and power consumption for performing the latching in each of the speculation units 12 can be avoided, so that power consumption as well as circuit area can be reduced.

FIGS. 6a to 6c indicate alternative embodiments of the dynamic preamplifier 13 and the transconductor 14. FIG. 6a shows an additional cross-coupled cascade 36 formed by cascade transistors 37a, 37b coupled between the second terminal of the input transistor 34a, 34b and the first terminal of the second enable transistor 33a, 33b in each of the branches 31a, 31b of the preamplifier 13, while the gate terminals are respectively coupled with the first terminal of the respective second enable transistor 33a, 33b of the respective other branch. This allows to achieve a higher gain of the preamplifier 13 while the power consumption is reduced.

FIG. 6b shows a further embodiment, wherein the transconductor 14 is formed as a common gate transconductor so that the transconductor transistors 42a, 42b of the embodiment of FIG. 5 can be omitted. So the current through the transconductor 14 is produced directly by the preamplifier 13 so that the transconductor 14 simply selects the current to its output. In other words, the preamplifier output node DAOa, DOAb is directly operated as a current source and is directly coupled with the first terminals of the selection transistors 43a, 43b, respectively, so that the preamplifier output node DAOa, DOAb directly supplies the current if selected.

FIG. 6c shows a combination of the embodiments of FIG. 6a, which is the cross-coupled cascade 36, and of FIG. 6b, which is the common gate transconductor 14. In the above decision-feedback equalizer only one dynamic regenerator 15 followed by a domino latch 60 is needed.

What is claimed is:

1. Digital decision feedback equalizer for use in a receiving unit for receiving an incoming data stream and for providing a stream of bit data outputs, including at least one decision-feedback equalizer block comprising:
   one dynamic regenerator for associating an output data bit to a selectively generated transconductor current; and
   a plurality of speculation units, each comprising:
      a dynamic preamplifier for asynchronously amplifying a voltage difference depending on an input voltage of the incoming data stream and a given threshold voltage; and, corresponding to each dynamic preamplifier,
      a means for selectively generating the transconductor current which depends on the amplified voltage difference of the corresponding dynamic preamplifier,
   wherein a speculation logic is provided which is configured to select exactly one of the speculation units depending on at least one previous bit data output, so that the exactly one selected of the speculation units provides the respective transconductor current while the other speculation units provide no transconductor current.

2. Decision-feedback equalizer according to claim 1, wherein to each of the speculation units a unique threshold voltage is associated.

3. Decision-feedback equalizer according to claim 1, wherein the speculation units are interconnected with their outputs to form a current summing node, wherein the input of the one dynamic regenerator is coupled to the summing node.

4. Decision-feedback equalizer according to claim 1, wherein the dynamic preamplifier of each speculation unit includes a differential amplifier.

5. Decision-feedback equalizer according to claim 4, wherein the differential amplifier includes a cross-coupled cascade.

6. Decision-feedback equalizer according to claim 4, wherein the differential amplifier is connected as a common-gate transconductor to directly provide the transconductor current, wherein a selection transistor is provided to select the transconductor current to be supplied to the dynamic regenerator.

7. Decision-feedback equalizer according to claim 1, wherein the means for selectively generating a transconductor current includes a selectable transconductor to convert an output voltage of the differential amplifier to the transconductor current.

8. Decision-feedback equalizer according to claim 1, wherein the dynamic regenerator includes a pair of cross-coupled inverters receiving the selected transconductor current to provide a spread output voltage corresponding to an output data bit depending on the sign of the transconductor current.

9. Decision-feedback equalizer according to claim 8, wherein the output of the dynamic regenerator is coupled with a domino latch to hold the spread output voltage as the output data bit which is the binary decision result of the dynamic regenerator.

10. Decision-feedback equalizer according to claim 1, wherein two decision-feedback equalizer blocks are configured to be operated in an interleaving manner.

11. Digital decision feedback equalizer for use in a receiving unit for receiving an incoming data stream and for providing a stream of bit data outputs, including at least one decision-feedback equalizer block comprising:
   one dynamic regenerator for associating an output data bit to a selectively generated transconductor current; and
   a plurality of speculation units, each consisting of:
      a dynamic preamplifier for asynchronously amplifying a voltage difference depending on an input voltage of the incoming data stream and a provided threshold voltage; and
      a selectable voltage to current converter for selectively generating the transconductor current so that it depends on the amplified voltage difference.

12. Decision-feedback equalizer according to claim 11, wherein the dynamic preamplifier is configured to directly amplify the input voltage of the incoming data stream without latching.

13. Decision-feedback equalizer according to claim 11, wherein the speculation units are interconnected with their outputs to form a current summing node, wherein the input of the dynamic regenerator is coupled to the summing node.

14. Receiving unit comprising a digital decision-feedback equalizer for use in a receiving unit of an incoming data stream and for providing a stream of bit data outputs, including at least one decision-feedback equalizer block comprising:
   one dynamic regenerator for associating an output data bit to a selectively generated transconductor current; and
   a plurality of speculation units, each comprising:
      a dynamic preamplifier for asynchronously amplifying a voltage difference depending on an input voltage of the incoming data stream and a provided threshold voltage;
      a means for selectively generating the transconductor current based on the amplified voltage difference.

* * * * *